United States Patent
Sasaki et al.

(10) Patent No.: US 8,074,630 B2
(45) Date of Patent: Dec. 13, 2011

(54) INTERNAL COMBUSTION ENGINE CONTROL DEVICE AND INTERNAL COMBUSTION ENGINE CONTROL SYSTEM

(75) Inventors: Satoru Sasaki, Kariya (JP); Tokuji Kuronita, Kariya (JP)

(73) Assignee: Denso Corporation, Kariya (JP)

( * ) Notice: Subject to any disclaimer, the term of this patent is extended or adjusted under 35 U.S.C. 154(b) by 328 days.

(21) Appl. No.: 12/428,764

(22) Filed: Apr. 23, 2009

(65) Prior Publication Data

US 2009/0266345 A1 Oct. 29, 2009

(30) Foreign Application Priority Data

Apr. 24, 2008 (JP) ................. 2008-113549

(51) Int. Cl.
*F02B 47/08* (2006.01)
*F02B 47/00* (2006.01)

(52) U.S. Cl. ................................ 123/568.22
(58) Field of Classification Search ............ 123/568.22, 123/568.21, 568.24, 568.14, 568.12; 701/108; 60/605.1, 605.2, 278, 280, 298
See application file for complete search history.

(56) References Cited

U.S. PATENT DOCUMENTS

| | | | | |
|---|---|---|---|---|
| 4,181,110 | A * | 1/1980 | Kohama et al. | 123/676 |
| 4,196,706 | A * | 4/1980 | Kohama et al. | 123/676 |
| 5,918,582 | A | 7/1999 | Itoyama et al. | |
| 6,032,656 | A | 3/2000 | Itoyama et al. | |
| 6,170,469 | B1 | 1/2001 | Itoyama et al. | |
| 6,230,697 | B1 | 5/2001 | Itoyama et al. | |
| 7,392,797 | B2 * | 7/2008 | Ogawa et al. | 123/568.14 |
| 2006/0102158 | A1* | 5/2006 | Cairns et al. | 123/568.14 |
| 2007/0074707 | A1* | 4/2007 | Ogawa et al. | 123/568.14 |

FOREIGN PATENT DOCUMENTS

JP 09-053519 2/1997

* cited by examiner

*Primary Examiner* — Mahmoud Gimie
(74) *Attorney, Agent, or Firm* — Nixon & Vanderhye P.C.

(57) ABSTRACT

An internal combustion engine control device and an internal combustion engine control system are disclosed as applied to an internal combustion engine having external EGR regulating device for regulating an external EGR amount in which a part of exhaust gases is recirculated from an exhaust gas passage to an air-intake passage, an internal EGR regulating device for regulating an internal EGR amount in which a part of combusted gases remains in a cylinder. External and internal EGR ratio control means controls operations of the external EGR regulating device and the internal EGR regulating device to variably control a ratio between the external EGR amount and the internal EGR amount depending on a surrounding atmospheric pressure.

7 Claims, 5 Drawing Sheets

INTERNAL COMBUSTION ENGINE CONTROL DEVICE AND INTERNAL COMBUSTION ENGINE CONTROL SYSTEM

CROSS REFERENCE TO RELATED APPLICATIONS

This application is based on Japanese Patent Application No. 2008-113549, flied on Apr. 24, 2008, the content of which is hereby incorporated by reference.

BACKGROUND OF THE INVENTION

1. Technical Field of the Invention

The present invention relates to engine control devices and engine control systems and, more particularly, to an internal combustion engine control device and an internal combustion engine control system applied to an internal combustion engine having recirculation means for recirculating a part of exhaust gases from an exhaust gas passage to an air-intake passage.

2. Description of the Related Art

In the related art, there has been known an EGR system arranged to recirculate a part of exhaust gases from an exhaust gas passage to an air-intake passage for thereby achieving a reduction in a NOx component of exhaust gases as disclosed in Japanese Patent Application Publication No. H09-53519.

With the EGR system of such a structure, under a circumstance where a vehicle, carrying an internal combustion engines is running in, for instance, high altitudes (at a height of, for instance, 1000 m above sea level), a surrounding atmospheric pressure decreases with a resultant decrease in a mass flow rate of intake air drawn into a cylinder. This results in a decrease in the amount of oxygen intake air and, hence, the EGR system is compelled to reduce a recirculation rate (hereinafter referred to as "EGR amount") for the purpose of obtaining a stabilized combusting state. This results in a difficulty of adequately exhibiting a favorable NOx eliminating effect.

SUMMARY OF THE INVENTION

The present invention has been completed with a view to addressing the above issue and has an object to provide an internal combustion engine control device and an internal combustion engine control system that can obtain a compromise between a low emission and combustion stability even under a low atmospheric pressure.

To achieve the above object, a first aspect of the present invention provides an internal combustion engine control device applied to an internal combustion engine having a cylinder, an air-intake passage through which air is supplied to the cylinder, an exhaust gas passage through which exhaust gases are emitted from the cylinder, an external EGR regulating device for regulating an external EGR amount of exhaust gases partially recirculated from the exhaust passage to the air-intake passage, and an internal EGR regulating device for regulating an internal ECR amount of combusted gases partially remaining in the cylinder, the internal combustion engine control device comprising: external and internal EGR ratio control means for controlling operations of the external EGR regulating device and the internal EGR regulating device for thereby controlling a ratio between the external EGR amount and the internal EGR amount; and surrounding atmospheric pressure acquiring means for acquiring a surrounding atmospheric pressure around the internal combustion engine; the external and internal ER ratio control means variably controlling the ratio depending on the acquired surrounding atmospheric pressure.

Upon various studies conducted by the present inventors, technical findings have been obtained with a focus on a ratio between an external EGR amount, in which a part of exhaust gases is recirculated from the exhaust passage to the intake-air passage and an internal EGR amount in which a part of combusted gases is caused to remain in a cylinder. That is, altering such a ratio ensures enables the combusting stability to be ensued without causing any remarkable reduction in a total amount of the external EGR amount and the internal EGR amount (hereinafter referred to as "a total EGR amount") even under the low surrounding atmospheric pressure. With a second aspect of the present invention, the ratio between the external EGR amount and the internal EGR amount is variably controlled depending on the surrounding atmospheric pressure. This makes it possible to ensure combusting stability without causing any remarkable reduction in the total EGR amount even under the low surrounding atmospheric pressure for thereby providing a compromise between the low emission and the combusting stability.

To describe such technical findings in more detail, even if the same total EGR amounts are present, the higher the ratio of the internal EGR amount is, the higher the in-cylinder temperature becomes. In addition, the higher the in-cylinder temperature is, the greater the igniting stability becomes with a resultant increase in combusting stability. However, if the in-cylinder temperature increases in excess, then, smoke occurs in exhaust gases. Moreover, if internal combustions engines are is caused to operate in the same control conditions, the lower the surrounding atmospheric pressure is, the lower the amount of oxygen in intake air becomes with a resultant decrease in the inc-cylinder. With the above view in mind, the second aspect of the present invention allows the external and internal EGR ratio control means to perform a control such that the lower the surrounding atmospheric pressure of the internal combustion engine, the higher will be the ratio of the internal EGR amount to the external EGR amount. This suppresses a decrease in the in-cylinder temperature even if the surrounding atmospheric pressure decreases, thereby increasing combusting stability. In addition, if the surrounding atmospheric pressure increases, it becomes possible to have a low ratio of the internal EGR, thereby enabling the avoidance of the occurrence of smoke.

Meanwhile, with an internal combustion engine equipped with a supercharger, the lower the external EGR amount, the greater the flow rate of exhaust gases serving as a drive force and supplied to the supercharger becomes. This increases a supercharge pressure with a resultant increase in a mass flow rate of intake air, thereby enabling an increase in the amount of oxygen in intake air. The second aspect of the present invention, in which the lower the surrounding atmospheric pressure is, the greater the internal EGR amount becomes, can be applied to the internal combustion engine equipped with the supercharger. This results in a favorable effect in which the lower the surrounding atmospheric pressure, the greater the supercharge pressure becomes with a resultant increase in the amount of oxygen in intake air, thereby enabling improvement in combusting stability.

With a fourth aspect of the present invention, the external and internal EGR ratio control means may preferably include at least one of: a variable valve timing mechanism for variably controlling a closing timing of an exhaust valve mounted in the cylinder; an exhaust pipe control valve mounted in the exhaust gas passage to control a flow rate of exhaust gases emitted through the exhaust passage; and a supercharge pressure control mechanism disposed in the supercharger for variably controlling a percentage of converting fluid energy of exhaust gases to the drive force.

With such a structure, controlling the operation of the variable valve timing mechanism so as to make the closing timing of the exhaust valve faster enables the internal EGR amount to be easily increased. In addition, controlling the operation of a supercharger control mechanism so as to increase the ratio of converting fluid energy of exhaust gases to the drive force results in a capability of easily increasing the internal EGR amount.

Further, concrete examples of "a structure enabled to variably set the ratio of converting fluid energy of exhaust gases to the drive force" include a structure in which a turbocharger takes the form of a structure composed of a turbine wheel provided with a variable vane or a structure in which the turbocharger includes a variable flap to adjust a flow rate of blowing out a stream of exhaust gases to the turbine wheel, etc.

With a fifth aspect of the present invention, an internal combustion engine control system may preferably comprise at least one of the internal combustion engine control device, an external EGR regulating device for recirculating a part of exhaust gases to a cylinder of an engine via an EGR passage interconnected between an exhaust gas passage and an air-intake passage, an internal EGR regulating device causing a part of combusted to remain in the cylinder, and a surrounding atmospheric pressure detecting sensor for detecting a surrounding atmospheric pressure. The internal combustion engine control system can exhibit the same advantageous effects as those set forth above.

With another aspect of the present invention, there is provided an internal combustion engine control device applied to an internal combustion engine having a cylinder, an air-intake passage through which air is supplied to the cylinder and an exhaust gas passage through which exhaust gases are emitted from the cylinder, the internal combustion engine control device comprising: an external EGR regulating device connected between the air-intake passage and the exhaust gas passage for regulating an external EGR amount of exhaust gases partially recirculated from the exhaust passage to the air-intake passage; an internal EGR regulating device for regulating an internal ECR amount of combusted gases partially remaining in the cylinder, external and internal EGR ratio control means for controlling operations of the external EGR regulating device and the internal EGR regulating device for thereby controlling a ratio between the external EGR amount and the internal EGR amount; and surrounding atmospheric pressure acquiring means for acquiring a surrounding atmospheric pressure around the internal combustion engine. The external and internal EGR ratio control means variably controls the ratio depending on the acquired surrounding atmospheric pressure such that the lower the surrounding atmospheric pressure, the greater will be the internal EGR amount.

With another aspect of the present invention, there is provided an internal combustion engine control device applied to an internal combustion engine having a cylinder, an air-intake passage through which air is supplied to the cylinder and an exhaust gas passage through which exhaust gases are emitted from the cylinder, the internal combustion engine control device comprising: an external EGR regulating device connected between the air-intake passage and the exhaust gas passage for regulating an external EGR amount of exhaust gases partially recirculated from the exhaust passage to the air-intake passage; an internal EGR regulating device for regulating an internal EGR amount of combusted gases partially remaining in the cylinder; external and internal EGR ratio control means for controlling operations of the external EGR regulating device and the internal EGR regulating device for thereby controlling a ratio between the external EGR amount and the internal EGR amount; and surrounding atmospheric pressure acquiring means for acquiring a is surrounding atmospheric pressure around the internal combustion engine. The external and internal EGR ratio control means is responsive to an engine rotation speed, an engine load and the surrounding atmospheric pressure. The external and internal EGR ratio control means includes means for determining a target EGR amount in response to the surrounding atmospheric pressure such that the lower the engine rotation speed and the engine load, the larger will be the total EGR amount, and means for variably controlling the ratio between the external EGR amount and the internal EGR amount in the target EGR amount depending on the surrounding atmospheric pressure such that the lower the surrounding atmospheric pressure, the greater will be the internal EGR amount.

DETAILED DESCRIPTION OF PREFERRED EMBODIMENTS

Now, an internal combustion engine control device and an internal combustion engine control system according to the present invention are described below with reference to the embodiment shown in the accompanying drawings. However, the present invention is construed not to be limited to such embodiment described below and technical concepts of the present invention may be implemented in combination with other known technologies or the other technology having functions equivalent to such known technologies.

An internal combustion engine control device of one embodiment according to the present invention will be described below with reference to the accompanying drawings as applied to a compression ignition type internal combustion engine (diesel engine).

Figure 1:
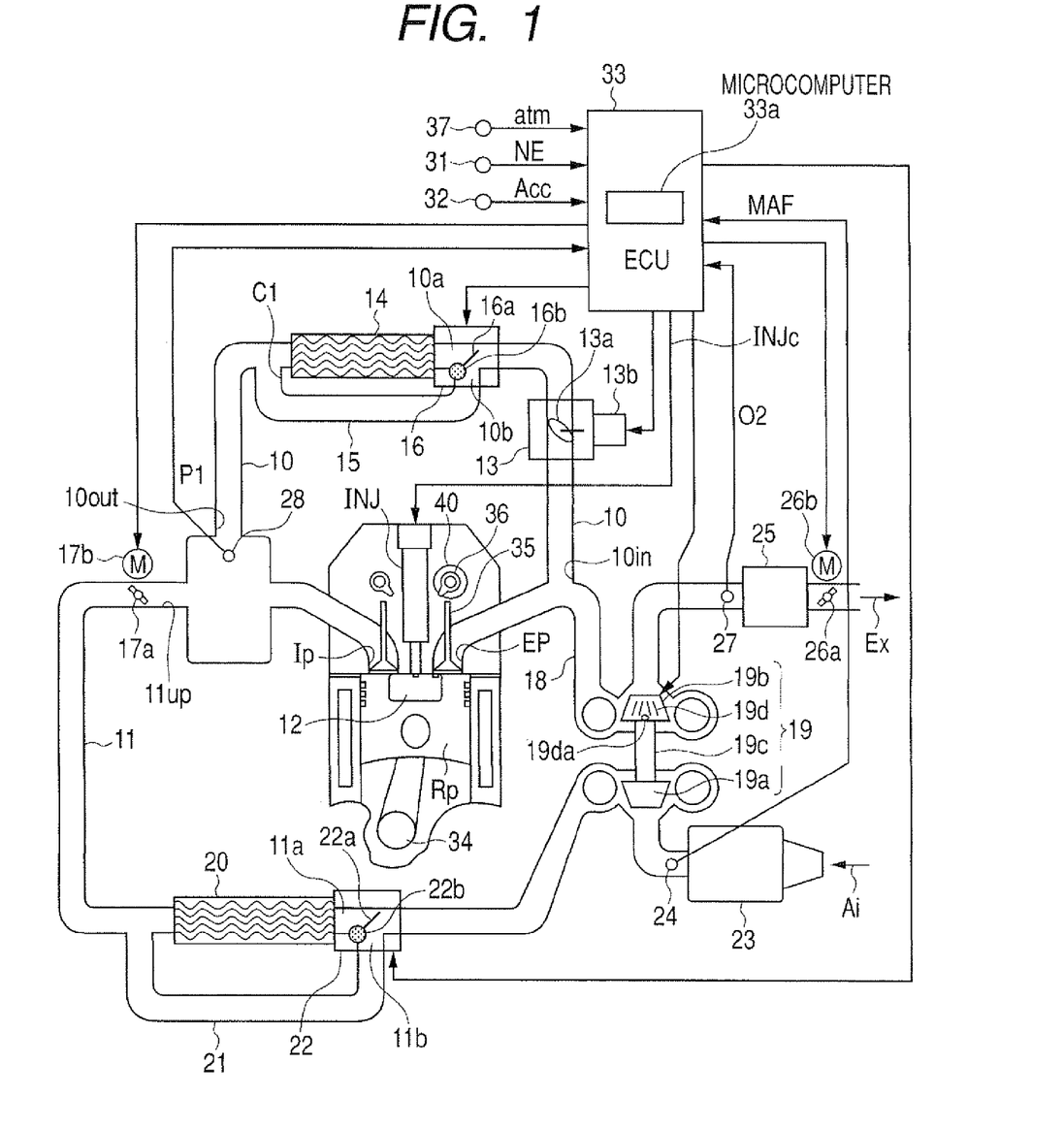
FIG. 1 is a schematic view showing a structure of an engine intake and exhaust system of one embodiment according to the present invention.

First, a structure of an air-intake and exhaust system of the engine is described with reference to FIG. 1. The engine E includes a combustion chamber 12 slidably accommodating a reciprocating piston Rp having a crankshaft 34, an inlet port Ip connected to an air-intake pipe 11 an exhaust system Es connected to an exhaust pipe 18 through which exhaust gases Ex are emitted to the outside, and an EGR (Exhaust Gas Recirculation) pipe 10 connected between an exhaust system and an air-intake system. More particularly, the EGR pipe 10 has an inlet 10 in connected to the exhaust pipe 18 and an outlet 10 out connected to the air-intake pipe 11 to recirculate a part of exhaust gases emitted to the exhaust pipe 18 to the air-intake pipe 11, thereby lowering a combustion temperature in the combustion chamber 12 to achieve a reduction in NOx in exhaust gases.

The EGR pipe 10 incorporates therein an EGR flow control device 13 for regulating a flow rate of EGR gas. The EGR flow control device 13 has a structure including an EGR valve 13a, operative to regulate a cross-sectional opening degree of a flow path of the EGR pipe 10, and an electric motor 13b for driving the EGR valve 13a. With the EGR valve 13a actuated in a fully opened state, an EGR flow rate is maximized. With the EGR valve 13a actuated in a fully closed state, however, the EGR flow rate is zeroed.

The EGR pipe 10 has an area downstream of the EGR valve 13a in which an EGR cooler 14 is disposed for cooling a stream of ER gas. Cooling the stream of EGR gas results in an effect of decreasing a volume of EGR gas (with an increase in density thereof) for thereby achieving improvement in charging efficiency of intake air being drawn to the combustion chamber 12.

A bypass pipe 15 is connected to EGR pipe 10 at the downstream area of the EGR valve 13a in parallel to detour the stream of EGR gas with respect to the EGR cooler 14. The bypass pipe 15 has an upstream site provided with a switching device 16 for switching the stream of EGR gas between the EGR cooler 14 and the bypass pipe 15.

The switching device 16 includes a switching valve 6a, operative to changeably open or close a flow path of the ER pipe 10 to be brought into communication with one of a flow inlet port 10a connected to the EGR cooler 14 and another flow inlet port 10b connected to the bypass pipe 15, and an electric motor 16b for driving the switching valve 16a.

The switching valve 16a has not only a function to changeably open or close both of the flow inlet ports 10a and 10b but also a function to assume an intermediate opening position with both the flow inlet ports 10a and 10h being opened at which the opening of the switching valve 16a is regulated. This enables an adjustment of a circulation percentage between a first flow rate of EGR gas being circulated to the ER cooler 14 and a second flow rate of EGR gas being detoured to the bypass pipe 15. This results in a capability of adjusting a temperature of EGR gas at a confluence C1 between a downstream area of the EGR cooler 14 and the bypass pipe 15. With such a structure, the temperature of EGR gas can be adjusted to an optimum value for thereby remarkably increasing an effect of NOx reduction due to recirculation of EGR gas.

The air-intake pipe 11 has an upstream area 11 up to which the EGR pipe 10 is connected and in which a throttle valve 17a is operatively mounted for regulating a flow rate of a stream of fresh air forming part of intake air being drawn to the combustion chamber 12. An electric motor 17b is drivably connected to the throttle valve 17a for opening or closing the same in operation such that when fully opened, the flow rate of fresh air is maximized.

A variable volume type turbocharger (supercharger) 19 is disposed between the air-intake pipe 11 and the exhaust pipe 18. The turbocharger 19 includes a compressor impeller 19a, mounted inside of the air-intake pipe 11, and a turbine wheel 19b, located inside the exhaust pipe 18, which are connected to each other via a common shaft 19c. With the turbocharger 19 of such a structure, the flow of exhaust gases passing through the exhaust pipe 18 causes the turbine wheel 19b to rotate with a rotational force being transferred through the common shaft 19c to the compressor impeller 19a. This allows the compressor impeller 19a to rotate at a high speed to compress intake air, passing through the air-intake pipe 11, thereby supercharging intake air being drawn to the combustion chamber 12.

With such a structure, the turbocharger 19 further adopts a variable volume type turbocharger that makes it possible to alter the setting of a percentage of converting fluid energy of exhaust gases to a rotational drive force of the common shaft 19c. More particularly, the turbine wheel 19b includes a plurality of variable vanes 19d (acting as a supercharging control mechanism and hereinafter merely referred to as a "variable vane") operative to vary a flow speed of exhaust gases impinging the variable vanes 19d. The variable vanes 19d are closed or opened in synchronized states. This enables a variation in a size of a clearance between neighboring variable vanes 19d, i.e., the opening degree of the adjacent variable vanes 19d. This results in an effect of adjusting the flow speed of exhaust gases, thereby regulating a rotation speed of the turbine wheel 19b. In addition, with the turbine wheel 19b rotating at the regulated rotation speed, a volume of intake air forcibly supplied to the combustion chamber 12, i.e., a supercharging pressure of intake air can be regulated.

The stream of intake air, supercharged by the turbocharger 19, is cooled by an intercooler 20 and subsequently delivered to a downstream area of the intercooler 20. Compelling the intercooler 20 to cool the stream of intake air results in a reduction in volume (with an increase in density of air), thereby achieving improvement in charging efficiency of intake air being drawn to the combustion chamber 12.

The air-intake pipe 11 has a bypass pipe 21 connected to the air-intake pipe 11 at a position upstream of the throttle valve 17a for diverting a supercharged and regulated stream of intake air from the intercooler 20. In addition, a switching device 22 is mounted in the air-intake pipe 11 at a position upstream of the intercooler 20 for switching a flow of intake air between the intercooler 20 and the bypass pipe 21.

The switching device 22 includes a switching valve 22a, operative to changeably open or close a flow inlet port 11a connected to the intercooler 20 and another flow inlet port 11b connected to the bypass pipe 21, and an electric motor 22b for driving the switching valve 22a. The switching valve 22a has not only a function to changeably open or close both the flow inlet ports 11a and 11b but also a function to assume an intermediate opening position with both the flow inlet ports 11a and 11b being opened at which the opening of the switching valve 22a is regulated. This enables adjustment of a circulation percentage between a first flow rate of intake air passing through the intercooler 20 and a second flow rate of intake air passing through the bypass pipe 21. This results in a capability of adjusting a temperature of fresh air whose flow rate is controlled with the throttle valve 17a.

The air-intake pipe 11 carries therein an airflow meter (intake-air flow sensor) 24 located in an area between an upstream area of the compressor impeller 19a and a downstream area of an air cleaner 23 for detecting a mass flow MAF (hereinafter merely referred to as intake-air flow quantity or intake-air flow) of intake air Ai drawn from the air cleaner 23 per unit time.

Meanwhile, the exhaust pipe 18 carries thereon an exhaust gas purifier 25 in an area downstream of the turbine wheel 19b to purify exhaust gases to be emitted to the outside. Concrete examples of the exhaust gas purifier 25 include a DPF (Diesel Particulate Filter), a NOx catalyst for purifying NOx in exhaust gases, and an oxidizing catalyst for purifying HC and CO contained in exhaust gases, etc.

Further, the exhaust pipe 18 carries thereon an exhaust pipe control valve 26a in an area downstream of the exhaust gas purifier 25 for controlling an exhaust emission rate of exhaust gases discharged to the outside of the engine. The exhaust pipe control valve 26a is drivably opened or closed by an electric motor 26b such that when fully opened, the exhaust emission rate of exhaust gases is maximized.

Furthermore, the exhaust pipe 18 carries thereon an A/F (Air/Fuel ratio) sensor 27 in an area upstream of the exhaust gas purifier 25 to detect a concentration of oxygen in exhaust gases for thereby detecting an air/fuel ratio. The A/F sensor 27 is an oxygen concentration sensor that outputs an oxygen concentration detection signal $O_2$ depending, on an oxygen concentration of exhaust gases at occasional timing. The A/F sensor 27 is arranged such that an oxygen concentration detection signal, delivered from the A/F sensor 27 as a sensor output, linearly varies in accordance with the oxygen concentration. In addition, an $O_2$ sensor of an electromotive force output type may be adopted in place of the A/F sensor 27 for outputting electromotive force signals different depending on whether exhaust gases remain in a rich state or a lean state.

An intake air pressure sensor 28 is mounted in the air-intake pipe 11 in an area downstream of the throttle valve 17a at a position close proximity to the outlet 10 out of the ECR pipe 10 for detecting an intake air pressure P1 (also representing a supercharging pressure of the turbocharger as described below).

The detection signals, output from the various sensors 24, 27 and 28, a crank angle sensor 31 connected to a crankshaft (described below) to detect a crank angle of the engine E for generating an output as an engine speed NE, an accel-sensor 32 connected to an accelerator pedal (not shown) to detect an accelerator pedal's depressed stroke Ace, representing an engine load, and an atmospheric pressure sensor 37 (surrounding atmospheric pressure sensor), etc., are applied to an engine ECU 33 (Engine Control Unit) that serves as an internal combustion engine controller. Upon receipt of these detection signals, the ECU 33 performs engine control for controlling a fuel injection quantity, a supercharge pressure, the opening degree of the EGR valve 13a, the opening degree of the throttle valve 17a, the opening degree of the exhaust pipe valve 26a, an opening degree of the variable vane 19d and the opening degrees of the switching valves 16a and 22a.

The ECU 33 includes a microcomputer 33a that functions to calculate a rotation speed (engine rotation speed NE) of a crankshaft (output shaft) 34 of the engine E based on the detection signal delivered from the crank angle sensor 31. In addition, the microcomputer 33a also functions to calculate a displacement value (depressed stroke) of an accelerator pedal depressed by a driver based on the detection signal delivered from the accel-sensor 32. Then, upon receipt of an engine operating state (such as, for instance, engine rotation speed NE) and the accelerator's depressed stroke, etc., the microcomputer 33a calculates a target injection quantity Qfin of fuel to be injected to the combustion chamber 12. Thus, the microcomputer 33a outputs a control signal INJc to a fuel injector INJ so as to control an operation of the injector INJ to allow fuel to be injected at the target injection quantity Qfin.

The microcomputer 33a of the ECU 33 has another function to control the supercharge pressure upon regulating a capacity of the variable volume type turbocharger 19. That is, the microcomputer 33a calculates a target opening degree of the variable vane 19d by referring to a map or the like that takes parameters such as the target injection quantity Qfin and the engine rotation speed NE or the like. Subsequently, the microcomputer 33a controllably drives an actuator 19da such that the variable vane 19d achieves a target opening degree. Moreover, the microcomputer 33a controls the actuator 19da such that the higher the engine rotation speed NE or the greater the target fuel injection quantity Qfin, the greater will be the target opening degree of the variable vane 19d accompanied by an increase in the supercharging pressure. Furthermore, the ECU 33 regulates the opening degree of the variable vane 19d in feedback control to allow the supercharging pressure P1, detected with the intake air pressure sensor 28, to approach a target value.

Upon controlling the opening degree of the EGR valve 13a, the microcomputer 33a of the ECU 33 controls the opening degree of the EGR valve 13a, thereby controlling an EGR flow rate of EGR gas admitted from the exhaust pipe 18 to the EGR pipe to recirculate into the air-intake pipe 11. To this end, the microcomputer 33a calculates a target value (target exhaust oxygen concentration) of an oxygen concentration (exhaust oxygen concentration) by referring to a map or the like that takes the parameters such as the target injection quantity Qfin and the engine rotation speed NE or the like mentioned above. In addition, the microcomputer 33a sets a target EGR rate (a ratio of a total EGR volume to a fresh air volume) such that the exhaust oxygen concentration, detected with the A/F sensor 27, approaches the target exhaust oxygen concentration, upon which the microcomputer 33a calculates the opening degree of the EGR valve 13a to lie at the target EGR rate. That is, this can be said that the opening degree of the EGR valve 13a is controlled in feedback based on a deviation between the exhaust oxygen concentration and the target exhaust oxygen concentration.

In this connection, if the EGR volume is inadequate, then, no adequate NOx reduction effect is obtained with a resultant shortage in oxygen in an engine cylinder, thereby resulting in an increase in particulate matters (especially black smoke). To avoid the occurrence of such an issue, a need arises to increase the EGR volume almost to the limit with the occurrence of smoke for reducing NOx without causing any generation of smoke. To this end, the target exhaust oxygen concentration is set such that the exhaust oxygen concentration increases to a given value and more particularly with a strong correlation with the generation of smoke so as to increase the EGR volume almost to the limit with the occurrence of smoke for reducing NOx. In addition, the target exhaust oxygen concentration is updated depending on an operating state of the exhaust gas purifier 25.

Further, the engine E of the present embodiment incorporates therein a variable valve timing mechanism 40 operative to variably control a closing timing of an exhaust valve 35. The variable valve timing mechanism 40 has a structure that will be described below in detail with reference to FIGS. 2A and 2B.

Figure 2A:
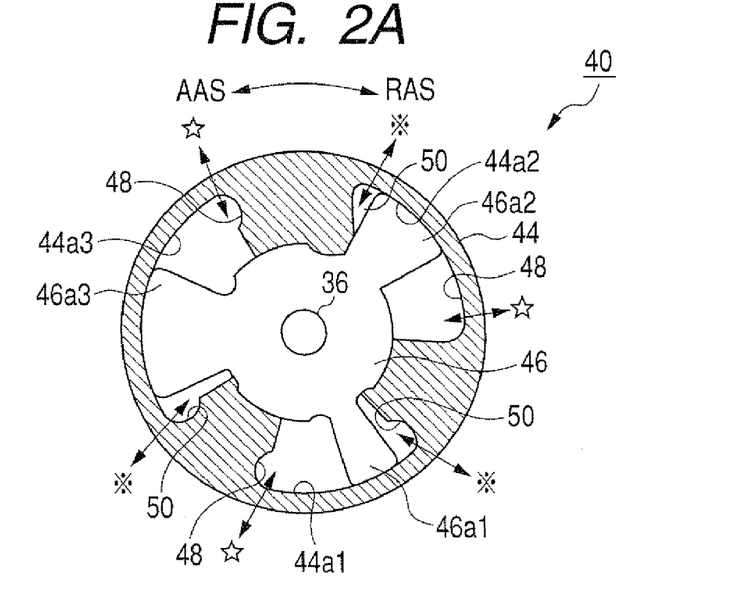
FIGS. 2A and 2B are views showing a structure of a variable valve timing mechanism used in the engine intake and exhaust system of the embodiment shown in FIG. 1.
Figure 2B:
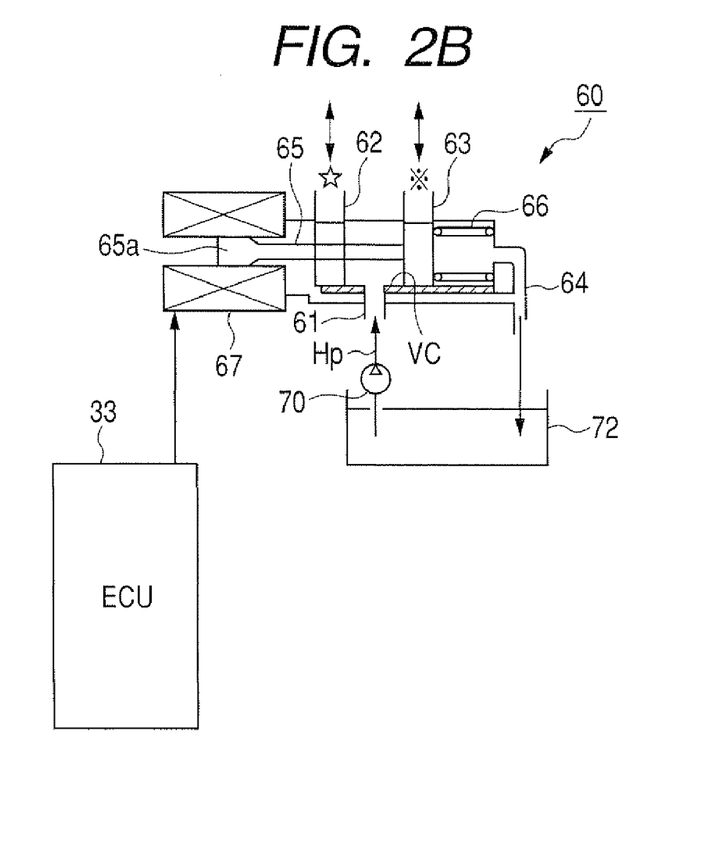

The exhaust valve 35 is driven with an exhaust camshaft 36, carried by an engine block of the engine E, which is connected to and powered by the crankshaft 34 to rotate one turn each time the crankshaft 34 rotates two turns for opening and closing the exhaust valve 35 one time. However, the exhaust camshaft 36 is linked to the crankshaft 34 by means of the variable valve timing mechanism 40. This makes it possible to actuate the exhaust valve 35 at a variable valve opening and closing timing determined for a rotational angle of the crankshaft 34.

More particularly, an output power of the crankshaft 34 is transferred through a belt (not shown) and the variable valve timing mechanism 40 to the exhaust camshaft 36. As shown in FIGS. 2A and 2B, the variable valve timing mechanism 40 includes a first rotary body 44 mechanically connected to the crankshaft 34, and a second rotary body 46 mechanically connected to the camshaft 36.

With the present embodiment, the first rotary body 44 has a plurality of circumferentially spaced inner chamber segments 44a1 to 44a3. The second rotary body 46 has a plurality of circumferentially spaced radial protrusions 46a1 to 46a3, which are accommodated in the inner chambers 44a1 to 44a3, respectively, of the first rotary body 44 to be circumferentially movable by given angles.

The chamber segment 44a1 has an advancing chamber 50a facing a counterclockwise direction and a retarding chamber 48a facing a clockwise direction. Likewise, the chamber segment 44a2 has an advancing chamber 50b, facing the counterclockwise direction, and a retarding chamber 48b facing the clockwise direction. Further, the chamber segment 44a3 has an advancing chamber 50c, facing the counterclockwise direction, and a retarding chamber 48c facing the clockwise direction.

The radial protrusions 46a1 to 46a3 have outermost end faces held in sliding engagement with inner walls of the respective inner chamber segments 44a1 to 44a3, which are defined as the advancing chambers and the retarding chambers, respectively. Each of the retarding chambers 48 allows the camshaft 36 to have a relative rotational angle (rotational phase difference) retarded with respect to the crankshaft 34. Likewise, each of the advancing chambers 50a to 50c allows the relative rotational angle to be advanced.

With the internal combustion engine control device of the present embodiment, as shown in FIG. 2B, the variable valve timing mechanism 40 further includes an oil control valve 60 connected to a hydraulic pressure source HS composed of for instance, an oil pan 72 and an oil pump 70 to draw oil under pressure as a hydraulic pressure Hp. The oil control valve 60 is operative to switch a hydraulic pressure path to deliver the hydraulic pressure Hp to and return the hydraulic pressure Hp from the variable valve timing mechanism 40. More particularly, the oil control valve 60 controls the supply of hydraulic pressure to one of the retarding chamber and the advancing chamber of each of the inner chamber segments 44a1 to 44a3, thereby controlling the operation of the variable valve timing mechanism 40.

The OCV 60 draws oil from the oil pan 72 to feed oil a supply path 61, from which oil is delivered to the retarding chambers 48 or the retarding chambers 50 through a retarding path 62 or an advancing path 63. Further, the OCV 60 allows oil to be returned from the retarding chambers 48 or the retarding chambers 50 to the oil pan 72 through the retarding path 62 or the advancing path 63. Flow path sectional areas between the retarding path 62 or the advancing path 63 and the supply path 61 and a drain path 64 are regulated with a spool 65 slidably disposed in a valve chamber VC. That is, the spool 65 is urged by a spring 66 accommodated in the valve chamber VC toward the left most position under which the retarding path 62 and advancing path 63 are closed. The spool 65 has an end portion formed with a plunger 65a operatively disposed in a solenoid 67 and moved rightward against a force of the spring 66 with the solenoid 67 being energized. Therefore, applying an operating pulse signal to the solenoid 67 with a controlled duty cycle makes it possible to vary a displacement position of the spool 67.

To this end, the ECU 33 is arranged to output the operating pulse signal to the solenoid 67, thereby performing a duty control of the solenoid 67. This allows a hydraulic pressure to be controlled to controllably actuate the variable valve timing mechanism 40 for thereby controlling a rotational phase difference of the camshaft 36 with respect to the crankshaft 34.

Meanwhile, when a vehicle is running in high altitudes (at an altitude of for instance, 1000 m), a surrounding atmospheric pressure decreases, resulting in a decrease in a mass flow rate of intake air drawn to the combustion chamber 12 via the air cleaner 23. This results in a particular concern that the amount of oxygen in a stream of intake air is lessened with the occurrence of deterioration in stability of a combustion state. Merely making an attempt to simply decrease the amount of EGR recirculated through the EGR pipe 10 to overcome such a concern results in a difficulty of adequately exhibiting a NOx reduction effect due to EGR recirculation.

As used herein, the amount (EGR amount set forth above) of exhaust gas to be recirculated through the EGR pipe 10 is referred to as "an external EGR amount" and the amount of combusted gas to be partially left in the combustion chamber 12 is referred to as "an internal EGR amount". With the present embodiment, the operation is executed to perform a control (external/internal EGR ratio control) for variably setting a ratio between the external EGR amount and the internal EGR amount depending on the surrounding atmospheric pressure, thereby achieving a low emission and combustion stability in combination.

Figure 3:
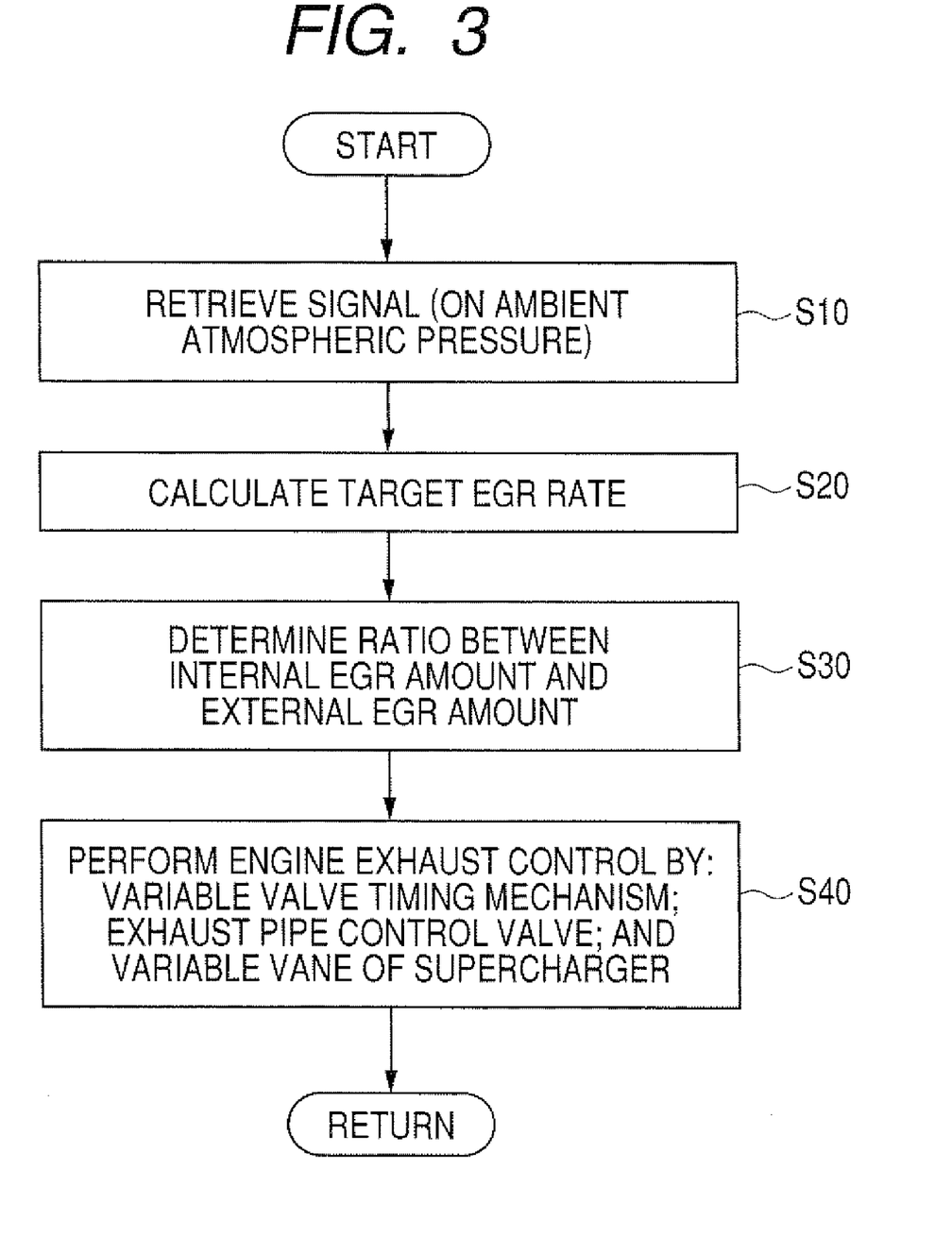
FIG. 3 is a flow chart showing a basic sequence of operations to be executed by an ECU forming part of the engine intake and exhaust system of the embodiment shown in FIG. 1 to perform an external and internal EGR ratio control.

FIG. 3 is a flow chart showing a basic sequence of routine, executing the external/internal EGR ratio control, which is repeatedly executed with the microcomputer 33a on a given cycle (of, for instance, a computing cycle of CPU or each of a given crank angle).

First at step S10, the microcomputer 33a retrieves an output signal "atm" from the atmospheric pressure sensor 37 to calculate surrounding air pressure (atmospheric pressure) based on the retrieved signal for acquiring surrounding air pressure. At succeeding step S20, a target EGR rate is set with a target value of a ratio of the amount of EGR for fresh air drawn through the air-intake pipe 11 at a flow rate regulated with the throttle valve 17a.

As used herein, the term "EGR amount" refers to a total amount (a total EGR amount) of the external ER amount and the internal EGR amount. In addition, the target EGR rate is set such that an exhaust oxygen concentration (air/fuel ratio), detected with the A/F sensor 27, approaches a target exhaust oxygen concentration (theoretical air fuel ratio). In an alternative, the target EGR rate is set upon retrieving a matching value preliminarily obtained on experimental tests and stored in a map by referring to the target fuel injection quantity Qfin or an engine load in the form of the accelerator pedal's depressed stroke Ace or the like and the engine rotation speed NE (see FIG. 1). In brief, the total EGR amount is determined such that the smaller the engine rotation speed and the engine load, the greater will be the target EGR rate.

Figure 4A:
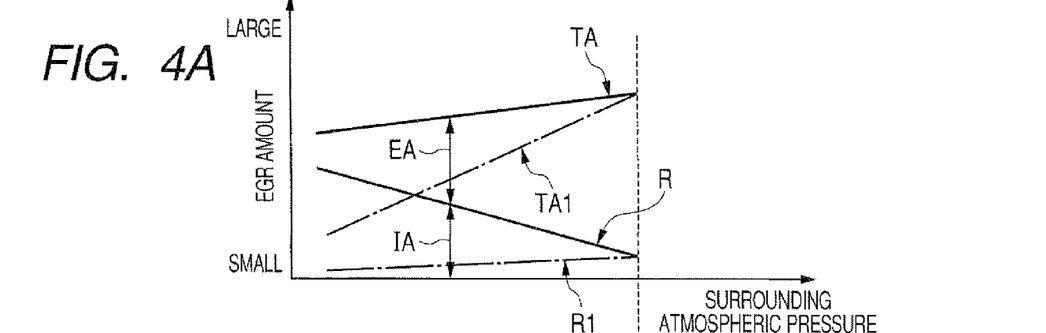
FIGS. 4A to 4D are views illustrating effects of the external and internal EGR ratio control executed in the flow chart shown in FIG. 3.

At consecutive step S30 corresponding to external and internal EGR ratio control means, the operation is executed to set the ratio (external and internal EGR ratio) between the external EGR amount and the internal EGR amount based on the surrounding atmospheric pressure acquired at step D10. The external and internal EGR ratio is determined such that the lower the surrounding atmospheric pressure, the greater will be the external and internal EGR ratio as shown by a solid line R in FIG. 4A. A solid line TA, shown in FIG. 4A, represents the total ER amount calculated based on the target EGR rate determined at S20. In FIG. 4A, single dot lines R1 and TA1 represent the external and internal EGR ratio and the total EGR amount obtained in the related art control. In FIG. 4A reference to "LA" represents the external EGR amount and reference to "IA" represents the internal EGR amount.

Figure 4B:
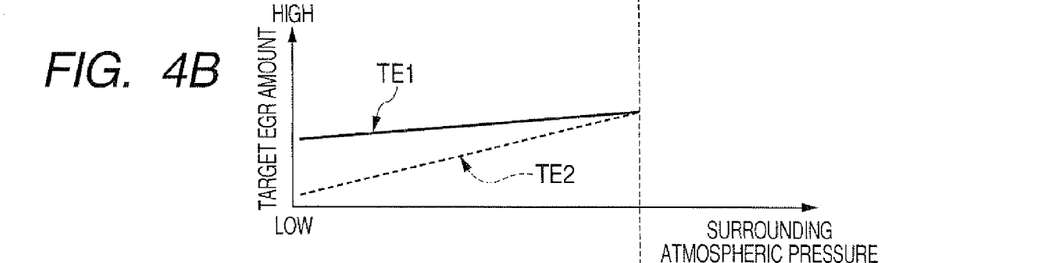

With the present embodiment, the target EGR rate is determined so as to vary in a manner as indicated by a solid line TE1 in FIG. 4B. The target EGR rate TE1 has a greater value than a target EGR rate, indicated by a broken line TE2 in FIG. 4B, which is achieved in the related art control.

As subsequent step S40 corresponding to the external and internal EGR ratio control means, the operation is executed to control the operation of internal EGR amount regulating means for regulating the internal EGR amount to achieve the external and internal EGR ratio set at step S30. The external and internal ER ratio control means includes the variable valve timing mechanism 40, the exhaust pipe control valve 26a mounted in the exhaust pipe 18, and the variable vane 19d of the turbocharger 19.

Figure 5A:
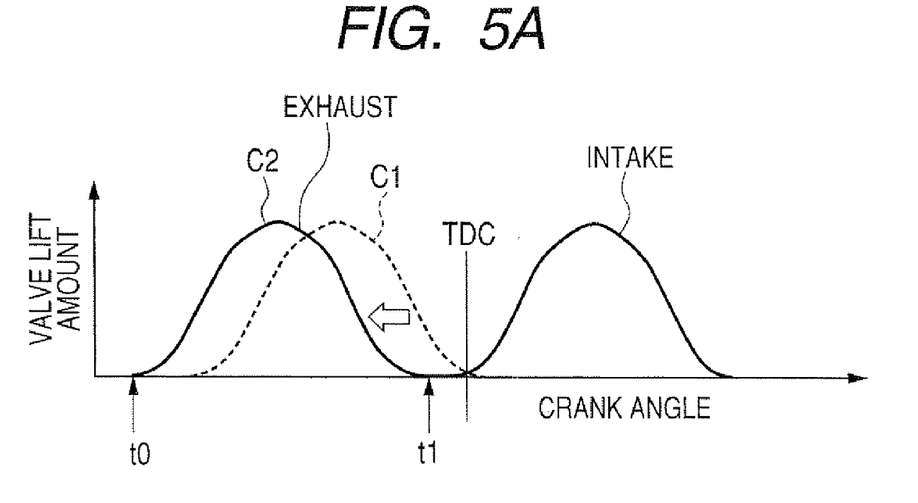
FIGS. 5A and 5B are views illustrating operations of the variable valve timing mechanism performed on the external and internal EGR ratio control shown in FIG. 3.

First, the variable valve timing mechanism 40 operates in a manner described below. When attempting to increase the internal EGR amount, the rotational phase difference is advanced. This allows opening and closing timings of the exhaust valve 35 to be switched from a pattern plotted on a curve indicated by a broken line C1 to another pattern plotted on a curve indicated by a solid line C2 in FIG. 5A. This allows the exhaust valve 35 to have a closing timing (i.e., a timing plotted at "t1" in FIG. 5A) made faster than TDC. Among combusted gases, the amount of exhaust gases emitted from the combustion chamber 12 decreases with a resultant increase in the internal EGR amount. The exhaust pipe control valve 26a operates such that the smaller the opening degree of the exhaust pipe control valve 26a, the greater will be the internal EGR amount.

Next, the operation of the variable vane 19d is described. When attempting to increase the internal EGR amount, the operation is executed to vary the opening degree of the variable vane 19d so as to increase a percentage of converting fluid energy of exhaust gases to a drive force. That is, the operation is executed to vary the opening degree of the variable vane 19d on a side to increase the supercharge pressure. This causes the variable vane 19d to increase a circulation resistance of exhaust gases. Thus, combusted gases are liable to remain in the combustion chamber 12 with a resultant increase in the internal EGR amount.

However, for the purpose of attaining the target EGR rate, there is a need to control the operation of the external EGR amount regulating means for regulating the external EGR amount in connection with the regulation of the internal EGR amount. The external EGR amount regulating means includes the EGR valve 13a and the throttle valve 17a, etc. More particularly, when attempting to increase the external EGR amount, it may suffice to increase the opening degree of the ER valve 13a while decreasing the opening degree of the throttle valve 17a.

With the present embodiment set forth above, the external and internal EGR ratio is determined such that the lower the surrounding atmospheric pressure, the greater will be the external and internal ER ratio. This results in first and second actions as described below.

(First Action)

That is, even if the total EGR amount remains constants the greater the ratio of the internal EGR amount is, the higher the temperature of the cylinder becomes. In addition, the higher the in-cylinder temperature is, the greater the igniting stability and the greater the combusting stability becomes. However, the presence of an excessive increase in the in-cylinder temperature results in the generation of smoke in exhaust gases. Meanwhile, the lower the surrounding atmospheric pressure is, the less the amount of oxygen of intake air and the lower the in-cylinder temperature becomes provided that the engine controlling states such as the opening degree of the throttle valve 17a and the target fuel injection quantity Qfin or the like remain unchanged.

With the present embodiment, in view of the phenomenon described above, the operation is executed such that the lower the surrounding atmospheric pressure, the greater will be the internal EGR amount. This enables the suppression of a drop in the in-cylinder temperature even if the surrounding atmospheric pressure decreases, thereby obtaining increased combusting stability. Moreover, the presence of an increase in the surrounding atmospheric pressure results in a drop in the ratio of the internal EGR amount, thereby enabling a reduction in the occurrence of smoke.

Figure 4C:
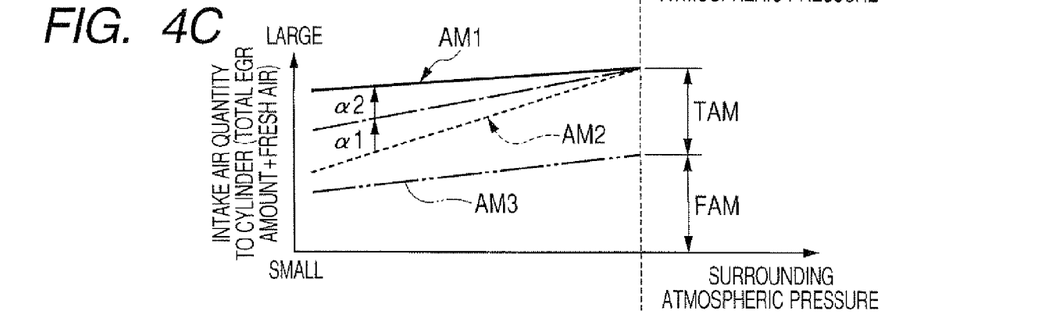
Figure 4D:
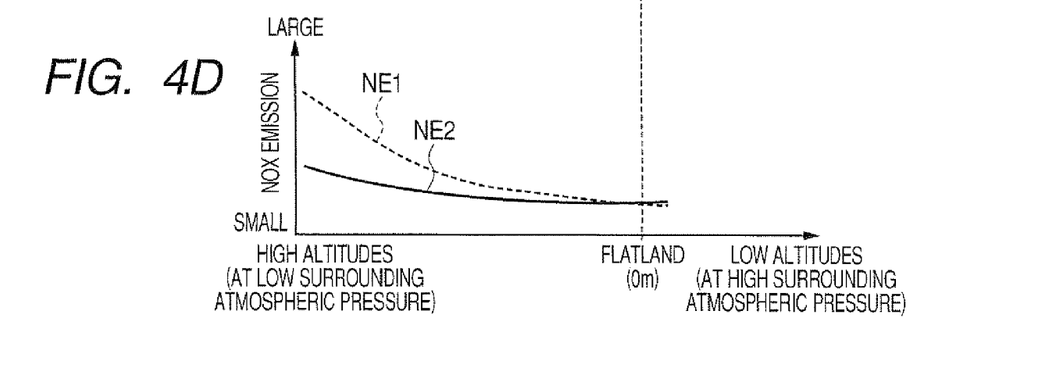

In FIG. 4C, a solid line AM1 represents the relationship between an intake-air amount (including a total EGR amount and a fresh air amount), attained with the present embodiment, and the surrounding atmospheric pressure. A broken line AM2 represents the relationship between the intake-air amount and the surrounding atmospheric pressure attained in the related art control in which a combusting stability is ensured upon varying the EGR amount with the external and internal EGR ratio remained fixed such that the lower the surrounding atmospheric pressure, the lower will be the EGR amount. With such a related art control, the lower the surrounding atmospheric pressure was, the further remarkable reduction in the EGR amount was caused (see the solid line TA1 in FIG. 4A and a broken line AM2 in FIG. 4C). Thus, the lower the surrounding atmospheric pressure, the remarkable increase in the amount of NOx emission becomes as indicated by a broken line NE1 shown in FIG. 4D.

On the contrary, with the present embodiment, it becomes possible to suppress the reduction in the total ER amount with the occurrence of the drop in the surrounding atmospheric pressure as indicated by the solid line TA in FIG. 4A and a solid line AM1 shown in FIG. 4C. This enables the suppression of an increase in the amount of NOx emission even under a low surrounding atmospheric pressure as indicated by a solid curve NE2 shown in FIG. 4D.

With such an effect of suppressing the drop in in-cylinder temperature due to the first action set forth above, the engine control device can have the nearly same in-cylinder temperature at a low altitude as that of the high altitude as shown in the example of FIGS. 4A to 4D. In other words, the total EGR amount can be increased to be greater than that of the related art control as indicated by the broken line AM2 by an increment α1 shown in FIG. 4D.

(Second Action)

As the ratio of the internal EGR amount increases, the external EGR amount decreases. Then, the amount of exhaust gases supplied to the turbine wheel 19b to act as a drive source increases. This rises the supercharge pressure to increase a mass flow of intake air accompanied by an increase in the amount of oxygen in intake air. With the present embodiment, in view of such an effect, the recirculation of exhaust gases can be controlled such that the lower the surrounding atmospheric pressure, the greater will be the ratio of the internal EGR amount. This enables control to be performed such that the lower the surrounding atmospheric pressure, the higher will be the supercharge pressure with the resultant increase in the amount of oxygen in intake air, enabling an increase in combusting stability. Moreover, such a second action provides an effect of increasing the amount of oxygen, enabling an increase in the total EGR amount to be greater than that indicated by the broken line AM2 attained with the related art control by an increment a2 shown in FIG. 4C.

In this connection, even though the engine control device of the present embodiment enables the increase in the amount of oxygen as set forth above, the amount of fresh air decreases with a decrease in the surrounding atmospheric pressure as shown by a double dot line AM3 in FIG. 4C. However, the effect of increasing the amount of oxygen results in a capability of suppressing such a decrease.

With the present embodiment set forth above, the control is performed such that the lower the surrounding atmospheric pressure, the greater will be the ratio of the internal EGR amount. Due to the effects of the first action with the capability of suppressing the drop in in-cylinder temperature and the second action with the capability of increasing the amount of oxygen, as set forth above, the total EGR amount can be increase to be greater than that attained with the related art control and indicated by the broken line AM2 by the increments of α1 and α2. Thus, even if the engine operating under a condition at a low surrounding atmospheric pressure, the engine can be operated with ensured combusting stability without causing any remarkable decrease in the total EGR amount thereby achieving a compromise between low emission and combusting stability.

(Other Modified Forms)

The present embodiment may be modified as described below. Further, the present invention is not limited to a disclosed content set forth above and may be implemented in various combinations of various structural features described below.

Figure 5B:
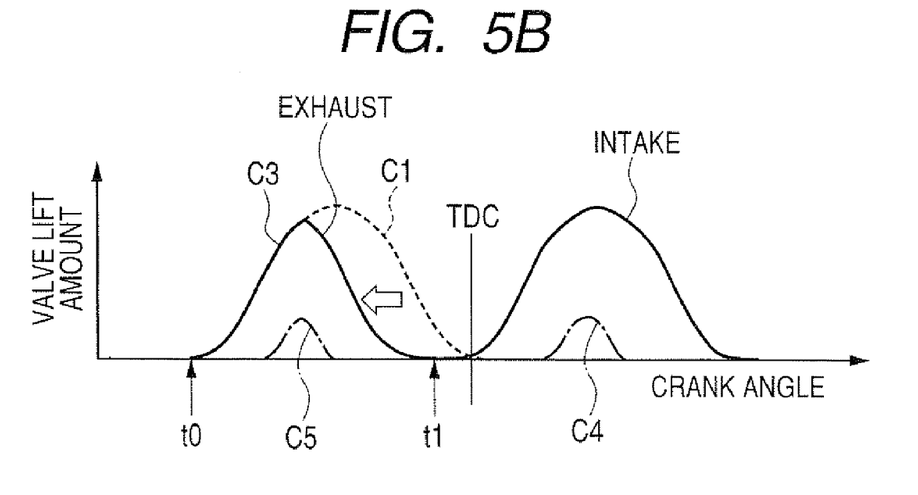

With the variable valve timing mechanism 40 shown in FIGS. 2A and 2B, the rotational phase difference is advanced to make the closing timing t1 of the exhaust valve 35 faster. This causes the opening timing to of the exhaust valve 35 is also made faster. Thus, there is a limit in making the closing timing t1 faster. To address such a limit, a variable valve timing mechanism may be adopted having a structure enabled to variably set only the closing timing t1. This enables only the closing timing t1 to be set faster without causing any variation in the opening timing to as shown by a curve C3 in FIG. 5B. This is particularly useful because of a capability of increasing the maximum increment value of the internal EGR amount.

The variable valve timing mechanism 40, show in FIGS. 2A and 2B, takes the form of the structure in which the crankshaft 34 actuates the oil pump 70. In an alternative, a variable valve timing mechanism of a structure actuated by an electric motor. With such a structure, the exhaust valve 35 can be lifted up by a slight degree during a lift-up period of the air-intake valve as indicated by a curve C4 on a single dot line in FIG. 5B or the air-intake valve can be lifted up by a slight degree during a lift-up period of the exhaust valve 35 as indicated by a curve C5 on a single dot line in FIG. 5B. This enables an increase in the maximum increment value of the internal EGR amount.

With the present embodiment set forth above, the internal EGR amount regulating means is comprised of the variable valve timing mechanism 40, the exhaust pipe control valve 26a and the variable vane 19d. In an alternative, however, the internal EGR amount regulating means may include, for instance, at least one of these component parts.

The control system may be applied to an engine in which a bypass flow passage is bifurcated from the turbine wheel 19b to bypass a flow of exhaust gases and a waste gate valve is provided in the bypass flow passage to open or close the same. With such a structure, the waste gate valve may be caused to function as internal EGR regulating means. In such a case, the waste gate valve may have an arrangement to actuate in a direction to reduce a circulation rate of the bypass flow passage. This results in an increase in circulating resistance of exhaust gases, thereby causing combusted gas to be liable to remain in the combustion chamber 12 with a resultant increase in the internal EGR amount.

Although the present invention ahs been described above with reference to the structure as applied to the diesel engine, the present invention may be applied to an ignition type gasoline engine. In such an application, however, the gasoline engine may preferably include a direct fuel injection type engine with fuel being directly injected to an in-cylinder in which a fuel mixture of a lean state can be combusted.

The engine control device of the present embodiment may include means for detecting the in-cylinder temperature or means for estimating the in-cylinder temperature based on a physical quantity detected by an in-cylinder pressure sensor or the like. With such a structure, regulating a percentage of the internal EGR amount in a feedback control such that the detected or estimated in-cylinder temperature approach a target value results in a capability of setting the maximum total EGR amount with increased precision without causing the occurrence of smoke.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. An internal combustion engine control device applied to an internal combustion engine having a cylinder, an air-intake passage through which air is supplied to the cylinder, an exhaust gas passage through which exhaust gases are emitted from the cylinder, an external EGR regulating device for regulating an external EGR amount of exhaust gases partially recirculated from the exhaust passage to the air-intake passage, and an internal EGR regulating device for regulating an internal EGR amount of combusted gases partially remaining in the cylinder, the internal combustion engine control device comprising:

external and internal EGR ratio control means for controlling operations of the external EGR regulating device and the internal EGR regulating device for thereby controlling a ratio between the external EGR amount and the internal EGR amount; and surrounding atmospheric pressure acquiring means for acquiring a surrounding atmospheric pressure around the internal combustion engine;

wherein the external and internal EGR ratio control means variably controls the ratio depending on the acquired surrounding atmospheric pressure.

2. The internal combustion engine control device according to claim 1, wherein:

the external and internal EGR ratio control means performs a control such that the lower the surrounding atmospheric pressure of the internal combustion engine, the higher will be the ratio of the internal EGR amount to the external EGR amount.

3. The internal combustion engine control device according to claim 1, wherein:

the internal combustion engine includes a supercharger driven with a drive force in the form of a flow of the exhaust gases to supercharge intake air to the cylinder.

4. The internal combustion engine control device according to claim 3, wherein:

the external and internal EGR ratio control means includes at least one of:

a variable valve timing mechanism for variably controlling a closing timing of an exhaust valve mounted in the cylinder;

an exhaust pipe control valve mounted in the exhaust gas passage to control a flow rate of exhaust gases emitted through the exhaust passage; and a supercharge pressure control mechanism disposed in the supercharger for variably controlling a percentage of converting fluid energy of exhaust gases to the drive force.

5. An internal combustion engine control system, comprising:
- the internal combustion engine control device recited in claim 1; and at least one of:
- the external EGR regulating device for recirculating a part of the exhaust gases to the cylinder of the engine via an EGR passage interconnected between the exhaust gas passage and the air-intake passage;
- the internal EGR regulating device causing a part of the combusted gases to remain in the cylinder; and
- a surrounding atmosphere pressure detecting sensor for detecting the surrounding atmosphere pressure.

6. An internal combustion engine control device applied to an internal combustion engine having a cylinder, an air-intake passage through which air is supplied to the cylinder and an exhaust gas passage through which exhaust gases are emitted from the cylinder, the internal combustion engine control device comprising:
- an external EGR regulating device connected between the air-intake passage and the exhaust gas passage for regulating an external EGR amount of exhaust gases partially recirculated from the exhaust passage to the air-intake passage;
- an internal EGR regulating device for regulating an internal EGR amount of combusted gases partially remaining in the cylinder,
- external and internal EGR ratio control means for controlling operations of the external EGR regulating device and the internal EGR regulating device for thereby controlling a ratio between the external EGR amount and the internal EGR amount; and
- surrounding atmospheric pressure acquiring means for acquiring a surrounding atmospheric pressure around the internal combustion engine;
- wherein the external and internal EGR ratio control means variably controls the ratio depending on the acquired surrounding atmospheric pressure such that the lower the surrounding atmospheric pressure, the greater will be the internal EGR amount.

7. An internal combustion engine control device applied to an internal combustion engine having a cylinder, an air-intake passage through which air is supplied to the cylinder and an exhaust gas passage through which exhaust gases are emitted from the cylinder, the internal combustion engine control device comprising:
- an external EGR regulating device connected between the air-intake passage and the exhaust gas passage for regulating an external EGR amount of exhaust gases partially recirculated from the exhaust passage to the air-intake passage;
- an internal EGR regulating device for regulating an internal EGR amount of combusted gases partially remaining in the cylinder,
- external and internal EGR ratio control means for controlling operations of the external EGR regulating device and the internal EGR regulating device for thereby controlling a ratio between the external EGR amount and the internal EGR amount; and
- surrounding atmospheric pressure acquiring means for acquiring a surrounding atmospheric pressure around the internal combustion engine;
- wherein the external and internal EGR ratio control means is responsive to an engine rotation speed, an engine load and the surrounding atmospheric pressure, the external and internal EGR ratio control means including means for determining a target EGR amount in response to the surrounding atmospheric pressure such that the lower the engine rotation speed and the engine load, the larger will be the total EGR amount, and means for variably controlling the ratio between the external EGR amount and the internal EGR amount in the target EGR amount depending on the surrounding atmospheric pressure such that the lower the surrounding atmospheric pressure, the greater will be the internal EGR amount.

* * * * *